3,331,809
STABILIZED POLYALKYLENE OXIDES
Otto Mauz, Frankfurt am Main, Germany, assignor to Farbwerke Hoechst Aktiengesellschaft vormals Meister Lucius & Bruning, Frankfurt am Main, Germany, a corporation of Germany
No Drawing. Filed Mar. 30, 1965, Ser. No. 444,058
Claims priority, application Germany, Apr. 10, 1964, F 42,576
5 Claims. (Cl. 260—45.85)

The present invention relates to stabilized polyalkylene oxides and a process for preparing them.

It is known that homo- and copolymers of alkylene oxides, like all polyethers, are more or less liable to degradation reactions under the action of light and atmospheric oxygen and therefore, must be stabilized prior to being processed or used.

It has already been proposed to use aromatic amines or phenols as stabilizers, for example, for polypropylene oxide. However, such stabilizers are not effective enough to prevent degradation in the presence of light and/or at elevated temperatures.

Now I have found that polyalkylene oxides can be stabilized with phenols in an advantageous manner by using a mixture consisting of
(a) 1 to 5% by weight of a compound of the following Formula I

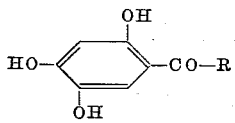

in which R stands for an alkyl radical with 1 to 18 carbon atoms,
(b) 0.1 to 2% by weight of bis(4-hydroxy-3-tert.butyl-6-methylphenyl)-sulfide, and
(c) 0.1 to 2% by weight of a compound of the following Formula II

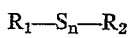

in which $n$ is a whole number within the range of 1 to 4, $R_1$ and $R_2$ each stand for an alkyl radical with 8 to 20 carbon atoms or the group $-(CH_2)_m-COOR_3$ in which group $m$ is a whole number within the range of 1 to 4 and $R_3$ is an alkyl radical with 8 to 20 carbon atoms, the above percentage figures being calculated on the polymer.

Exemplary of compounds of Formula I to be used in the process of the invention are 2,4,5-trihydroxy-acetophenone, 2,4,5-trihydroxy-butyrophenone, 2,4,5-trihydroxy-valerophenone, 2,4,5-trihydroxy-caprophenone, 2,4,5-trihydroxy-phenyl-octyl-ketone, 2,4,5-trihydroxyphenyl-nonylketone, 2,4,5-trihydroxy-phenyl-decylketone, 2,4,5-trihydroxyphenyl-dodecylketone, 2,4,5-trihydroxyphenyl-hexadecylketone and 2,4,5-trihydroxy-phenyl-octadecylketone.

Exemplary of compounds of Formula II to be used in the process of the invention are di(dodecyl) sulfide, di(octadecyl) sulfide, di(dodecyl) disulfide, di(octadecyl) disulfide, di(dodecyl) trisulfide, di(octadecyl) trisulfide, di(dodecyl) tetrasulfide, di(octadecyl) tetrasulfide, thiodiglycolic acid dodecyl ester, thiodipropionic acid octadecyl ester, thiodibutyric acid dodecyl ester, trisulfide (diacetic acid octadecyl ester) and tetrasulfide(diacetic acid octadecyl ester).

The mixtures make suitable stabilizers for polyalkylene oxides. The term "polyalkylene oxides" is here intended to mean homo- and copolymers of alkylene oxides which have been obtained by polymerizing saturated alkylene oxides, for example, ethylene oxide and propylene oxide; substituted epoxides, for example, epichlorhydrin, perfluoropropylene oxide and 1-chloro-3,4-epoxybutane; cycloaliphatic epoxides, for example cyclohexene oxide; epoxy ethers, for example methyl- and phenylglycidyl ethers; or by copolymerization of saturated with unsaturated epoxides, for example, allylglycidyl ether, o-allylphenylglycidyl ether, glycidyl acrylate, vinylcyclohexene monoepoxide, cyclohexene oxide, butadiene monoxide, 1,2-epoxyhexene-5, 1,2-epoxycyclooctene-(5), the said polymerization or copolymerization being carried out in known manner in the presence of ionic catalysts.

The abovementioned stabilizer mixtures are added to the polymer in solid form or in the form of a solution and then intimately mixed with the polymer. The stabilizer mixtures may also be used for stabilizing mixtures of polymers.

The polyalkylene oxides stabilized by the process of the invention may be used for many fields of application, for example, for the manufacture of shaped articles, films and fibers.

It is also possible to dissolve or swell the abovementioned homo- and copolymers in appropriate solvents or swelling agents. The solutions or swellings shall have a solid content of about 20 to 30%. Examples of suitable swelling agents or solvents are dimethyl formamide, tetramethylene sulfone, dioxane, methanol, benzene and other aromatic substances, chlorinated hydrocarbons, and double and triple mixtures of the said solvents or swelling agents.

To the solutions or swellings of the copolymers of saturated and unsaturated epoxides which have been stabilized in accordance with the invention, compounds having a cross-linking action may be added. Suitable cross-linking agents are, for example, sulfur-accelerator systems, organic peroxides or other substances forming free radicals under cross-linking conditions, for example, azoisobutyric acid dinitrile or azodicarboxylic acid diamide.

It is also possible to add to the solutions or swellings of the polymers stabilized in accordance with the invention a further substance, for example, active or inactive soots, light fillers, dyes or pigments, extender oils or lubricants.

The stability of the polyalkylene oxides stabilized by the process of the invention was examined as shown in the table given hereinafter.

The following example serves to illustrative the invention but it is not intended to limit it thereto, the parts being by weight.

Example

With the use of a copolymer of 92.5 mol percent of propylene oxide and 7.5 mol percent of allylglycidyl ether, a mixture having the following composition

|  | Parts |
|---|---|
| Copolymer | 100.0 |
| Thiourea | 1.0 |
| Active silicic acid | 15.0 |
| Zinc oxide | 7.5 |
| Dipentamethylene thiuramtetrasulfide | 5.0 |
| 2-mercaptobenzothiazole | 0.75 |
| Kronos white | 3.0 |
|  | 132.25 | was prepared on a roll mill at a temperature of the rolls of about 40° C.

100 parts of the mixture so obtained were dissolved in, or made into a paste with 400 parts of methanol, and a mixture of 3% by weight of 2,4,5-trihydroxybutyrophenone, 0.5% by weight of bis(4-hydroxy-3-tert.butyl-6-methyl-phenyl) sulfide and 0.5% by weight of di(octadecyl) disulfide was added.

With the use of water as the liquid for the precipitating bath, the mixture was spun under the following conditions and the filaments so obtained were subsequently cross-linked in a heated shaft:

| | |
|---|---|
| Spinning temperature | 20° C. |
| Conveying rate | 0.2 g./min. |
| Nozzle | 6/300μ. |
| Titer | 6/200 den. |
| Temperature of precipitating bath | 20° C. |
| Time of stay in precipitating bath | 60 sec. |
| Temperature of cross-linking | 160° C. |
| Time of cross-linking in heated shaft | 60 sec. |
| Draw-off rate | 5 m./min. |
| After-vulcanization on bobbin | 120 sec./160° hot air. |

TABLE

| Stabilizers | Concentration of stabilizer in percent by weight | Tensile strength in g./den. | Elongation at break in percent | After 24 hours of exposure to light [1] | | After 100 hours of exposure to light | |
|---|---|---|---|---|---|---|---|
| | | | | Tensile strength in g./den. | Elongation at break in percent | Tensile strength in g./den. | Elongation at break in percent |
| 2,4,5-trihydroxy-butyrophenone | 3 | 0.30 | 1,653 | 0.28 | 1,590 | 0.12 | 943 |
| Bis(4-hydroxy-3-tert.-butyl-6-methyl-phenyl) sulfide | 0.5 | | | | | | |
| Di(octadecyl) disulfide | 0.5 | | | | | | |
| Bis(4-hydroxy-3-tert.-butyl-6-methyl-phenyl) sulfide [2] | 2 | 0.30 | 1,650 | (³) | (³) | | |
| Di(octadecyl) disulfide | 2 | | | | | | |
| 2,4,5-trihydroxy-butyrophenone [2] | 4 | 0.30 | 1,655 | (³) | (³) | | |

[1] Rapid exposing to light of Xenotest lamp (temperature 45° C., relative atmospheric moisture 30%).
[2] Comparison tests.
[3] Fiber destroyed.

droxy-butyrophenone, 2,4,5-trihydroxy - valerophenone, 2,4,5-trihydroxy - caprophenone, 2,4,5-trihydroxy-phenyl-octyl-ketone, 2,4,5-trihydroxyphenyl-nonylketone, 2,4,5-trihydroxy-phenyl-decylketone, 2,4,5 - trihydroxyphenyl-dodecylketone, 2,4,5 - trihydroxyphenyl-hexadecylketone and 2,4,5-trihydroxy-phenyl-octadecylketone.

3. The composition according to claim 2 wherein component (c) is a member selected from the group consisting of di(dodecyl) sulfide, di(octadecyl) sulfide, di(dodecyl) disulfide, di(octadecyl) disulfide, di(dodecyl) trisulfide, di(octadecyl) trisulfide, di(dodecyl) tetrasulfide, di(octadecyl) tetrasulfide, thiodiglycolic acid dodecyl ester, thiodipropionic acid octadecyl ester, thiodibutyric acid dodecyl ester, trisulfide (diacetic acid octadecyl ester) and tetrasulfide (diacetic acid octadecyl ester).

4. The composition according to claim 3 wherein the polyalkylene oxide is a member selected from the group consisting of homopolymers of saturated epoxides and copolymers of saturated epoxides with unsaturated epoxides.

5. The composition according to claim 1 wherein component (a) is 2,4,5-trihydroxy-butyrophenone and component (c) is di(octadecyl) disulfide.

I claim:
1. A composition of matter comprising a polyalkylene oxide and a mixture consisting of (a) 1 to 5% by weight, calculated on the polymer, of a compound of the following formula

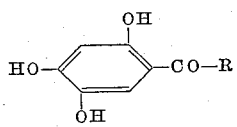

in which R stands for an alkyl radical with 1 to 18 carbon atoms, (b) 0.1 to 2% by weight, calculated on the polymer, of bis(4-hydroxy-3-tert.butyl-6-methylphenyl) sulfide, and (c) 0.1 to 2% by weight, calculated on the polymer, of a compound of the following formula

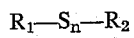

in which $n$ is a whole number within the range of 1 to 4, $R_1$ and $R_2$ each represent a member selected from the group consisting of an alkyl radical with 8 to 20 carbon atoms and the group $-(CH_2)_m-COOR_3$ in which group $m$ is a whole number within the range from 1 to 4 and $R_3$ stands for an alkyl radical with 8 to 20 carbon atoms.

2. The composition according the claim 1 wherein component (a) is a member selected from the group consisting of 2,4,5,-trihydroxy-acetophenone, 2,4,5-trihy-

References Cited
UNITED STATES PATENTS

| | | | |
|---|---|---|---|
| 2,686,123 | 8/1954 | Campbell et al. | 99—8 |
| 2,759,828 | 8/1956 | Bell et al. | 99—163 |
| 2,871,219 | 1/1959 | Baggett et al. | 260—45.95 |
| 2,871,220 | 1/1959 | MacDonald | 260—45.95 |
| 2,934,518 | 4/1960 | Smith | 260—45.9 |
| 3,219,623 | 11/1965 | Berardinelli | 260—45.95 |
| 3,235,624 | 2/1966 | Green | 260—857 |
| 3,277,044 | 10/1966 | Weissemel et al. | 260—45.8 |

DONALD E. CZAJA, *Primary Examiner.*

LEON J. BERCOVITZ, *Examiner.*

V. P. HOKE, *Assistant Examiner.*